United States Patent
Bai et al.

(10) Patent No.: US 10,015,197 B2
(45) Date of Patent: Jul. 3, 2018

(54) DETERMINING NETWORK SECURITY POLICIES DURING DATA CENTER MIGRATION AND DETECTING SECURITY VIOLATION

(71) Applicant: International Business Machines Corporation, Armonk, NY (US)

(72) Inventors: Kun Bai, Hartsdale, NY (US); Jinho Hwang, Ossining, NY (US); Jill L. Jermyn, New York, NY (US); Harigovind V. Ramasamy, Ossining, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 14/920,383

(22) Filed: Oct. 22, 2015

(65) Prior Publication Data

US 2017/0118244 A1    Apr. 27, 2017

(51) Int. Cl.
*H04L 29/06* (2006.01)
*G06N 99/00* (2010.01)

(52) U.S. Cl.
CPC .......... *H04L 63/20* (2013.01); *G06N 99/005* (2013.01); *H04L 63/0263* (2013.01)

(58) Field of Classification Search
None
See application file for complete search history.

(56) References Cited

U.S. PATENT DOCUMENTS

| | | | |
|---|---|---|---|
| 8,464,335 B1 | 6/2013 | Sinha et al. | |
| 8,789,181 B2 | 7/2014 | Blackwell | |
| 8,997,227 B1* | 3/2015 | Mhatre | H04L 63/1416 726/23 |
| 9,710,764 B1* | 7/2017 | Hodjat | G06N 99/005 |
| 2007/0192859 A1* | 8/2007 | Shahar | G06F 21/552 726/22 |
| 2008/0114710 A1* | 5/2008 | Pucher | G06N 99/005 706/20 |
| 2009/0138592 A1* | 5/2009 | Overcash | H04L 63/1425 709/224 |

(Continued)

OTHER PUBLICATIONS

Anand, Priya; Ryoo, Jungwoo; Rick Kazman Software. Vulnerability-based Security Pattern Categorization in Search of Missing Patterns. 2014 Ninth International Conference on Availability, Reliability and Security (ARES). Pub. Date: 2014. http://ieeexplore.ieee.org/stamp/stamp.jsp?tp=&arnumber=6980321.*

(Continued)

*Primary Examiner* — Jeremiah Avery
(74) *Attorney, Agent, or Firm* — Louis J. Percello; Ryan, Mason & Lewis, LLP (57) ABSTRACT

Input data are received from a source environment comprising a plurality of servers and one or more applications running on at least one of the servers. One or more patterns are discovered from the received data comprising information regarding the plurality of servers running applications that collectively perform a service. The patterns are analyzed to learn a recurring pattern. A security policy is designed for the recurring pattern. The recurring pattern and the security policy designed for the recurring pattern is stored in a database.

17 Claims, 10 Drawing Sheets

(56) References Cited

U.S. PATENT DOCUMENTS

| | | | |
|---|---|---|---|
| 2010/0235285 A1* | 9/2010 | Hoffberg | G06Q 20/401 |
| | | | 705/75 |
| 2010/0251329 A1* | 9/2010 | Wei | H04L 63/1408 |
| | | | 726/1 |
| 2010/0317420 A1* | 12/2010 | Hoffberg | G06Q 30/0207 |
| | | | 463/1 |
| 2012/0240183 A1 | 9/2012 | Sinha | |
| 2013/0291087 A1 | 10/2013 | Kailash et al. | |
| 2014/0164607 A1 | 6/2014 | Bai et al. | |
| 2014/0366082 A1 | 12/2014 | Agrawal et al. | |
| 2015/0058975 A1* | 2/2015 | Raskin | G06F 21/85 |
| | | | 726/22 |

OTHER PUBLICATIONS

Rojas-Cessa, Roberto. Schemes for Fast Transmission of Flows in Data Center Networks. IEEE Communications Surveys & Tutorials. vol. 17, Issue: 3. Pub. Date: 2015. http://ieeexplore.ieee.org/stamp/stamp.jsp?tp=&arnumber=7096919.*

Busnel, Pierre; El-Khoury, Paul; Giroux, Sylvain; Li-Keqin. Achieving Socio-Technical Confidentiality using Security Pattern in Smart Homes. FGCN '08. Second International Conference on Future Generation Communication and Networking. Pub. Date: 2008. http://ieeexplore.ieee.org/stamp/stamp.jsp?tp=&arnumber=4734253.*

Sonia Subramanian, "Security for Social Networks," An IP.com Prior Art Database Technical Disclosure, http://ip.com/IPCOM/000228051, Jun. 4, 2013, 12 pages.

Internet Society Requests for Comments et al., "Internet Architecture Extensions for Shared Media (RFC1620)," An IP.com Prior Art Database Technical Disclosure, http://ip.com/IPCOM/000002455, Sep. 12, 2000, 17 pages.

* cited by examiner

Generic Pattern

{[{"pattern":{ "name": "Web Service Name" , "type": "WebService", "component":}
"type": "WebServer",
"applications": [{"name": "http server", "version": "*", "required_ports": [{"port": 80}], "optional_ports": [{"port": 443}]}
{"name": "database", "version": "*", "required_ports", ....
},
"dependencies":[ {"source": "http server", "target": "application server"}, { } ..... { } ],
" ... "}, {"pattern": .....}, {"pattern": ..... },] }

FIG. 4B

Specific Pattern

{[{"pattern":{ "name": "Apache_DB2", "type": "WebService", "component":}
"type": "WebServer",
"applications": [{"name": "apache2", "version": "2.4", "required_ports": [{"port": 80}], "optional_ports": [{"port": 443}]}
{"name": "db2", "version": "9.7.1", "required_ports", ....
},
"dependencies":[ {"source": "apache2", "target": "jboss"}, { } ..... { } ],
" ... "}, {"pattern": .....}, {"pattern": ..... },] }

FIG. 5

Inputs: Labeled set $D_l$, unlabeled set $D_u$, number of steps T, number of examples per iteration S
$t = 1$;
*while $t <= T$ do*
    Train a multi-label SVM classifier f based on training data $D_l$
    for each instance x in $D_u$ do
        Predict its label vector y using the LR(loss reduction)-based prediction method
        $D^*_s = \text{argmax}_{D_s} (\Sigma_{x \in D_s} \Sigma_{i=1}((1 - y^i f_i(x))/2))$
        constrained to $y^i \in \{-1, 1\}$
        (equation for Maximum loss reduction with maximal confidence)
        Calculate the expected loss reduction with the most confident label vector y,
        $\text{score}(x) = \Sigma^k_{i=1} ((1 - y^i f_i(x))/2)$
        Sort score(x) in decreasing order for all x in $D_u$
        Select a set of S examples $D^*_s$ with the largest scores (or experienced SME input),
        and update the training set $D_l \leftarrow D_l + D^*_s$
    end for
    Train the multi-label learner l with $D_l$
    $t = t + 1$;
*end while*

FIG. 6A

ALDM NETSTAT OUTPUT

```
tcp, 10.10.15.10, 5553, 10.10.15.12, 8080, 50003 bytes
tcp, 10.10.15.12, 4455, 10.10.15.14, 1433, 8897 bytes
tcp, 173.39.67.8, 88954, 10.10.20.3, 21, 89 bytes
tcp, 123.14.55.67, 10.10.20.3, 20, 448 bytes
udp, 10.10.15.12, 4455, 10.10.15.14, 1433, 8897 bytes
udp, 145.44.56.3, 88767, 10.10.20.3, 989, 787 bytes
udp, 122.44.63.7, 76777, 10.10.20.3, 990, 6657 bytes
tcp, 122.44.64.6, 57756, 10,10.15.10, 80, 898 bytes
tcp, 145.56.44.45, 77878, 10.10.15.10, 443, 78 bytes
tcp, 10.10.20.3; 9989, 10.10.15.16, 3306, 79 bytes
udp, 145.56.44.45, 77878, 10.10.15.10, 443, 78 bytes
udp, 123.14.55.67, 10.10.20.3, 20, 488 bytes
udp, 10.10.20.3, 9989, 10.10.15.16, 3306, 79 bytes
```

DETERMINING NETWORK SECURITY POLICIES DURING DATA CENTER MIGRATION AND DETECTING SECURITY VIOLATION

BACKGROUND

A data center is a functionally centralized system for storing, managing, and disseminating data and information pertaining to one or more entities (e.g., one or more businesses). Typically, a data center comprises interconnected computing, storage and network components, business applications and security infrastructure. Today, many organizations opt to migrate their data centers from one computing platform to another (e.g., a physical computing platform environment to a virtual or cloud-based computing platform) with the expectation that it will result in more efficient and agile data centers. Current cloud and virtualization technologies, whether public or private, offer increased agility and capabilities to adapt to fast changing business needs while effectively reducing operating costs. However, whether for a physical-to-virtual migration or a cloud-to-cloud migration, a large-scale data center migration can pose risks such as significant time delays, business disruptions or unplanned downtime. Oftentimes, replicating the network or security policies between data centers is the most challenging task.

SUMMARY

Embodiments provide techniques for determining network security policies during a data center migration and detecting security violation during a steady-state operation.

For example, in one embodiment, a method comprises receiving input data from a source data center environment wherein the source data center environment comprises a plurality of servers and one or more applications running on at least one of the servers, discovering from the received data one or more patterns wherein the patterns comprise information regarding one or more of the plurality of servers running one or more of the applications that collectively perform a service, analyzing the patterns to learn a recurring pattern, determining a security policy for the recurring pattern and storing the recurring pattern and the security policy determined for the recurring pattern in a database.

In a further embodiment, the security policy is implemented in a destination data center environment. The method then detects one or more security policy violations during a steady-state operation, modifies the security policy for the recurring pattern, and updates the database with the modified security policy.

DETAILED DESCRIPTION

Illustrative embodiments of the invention may be described herein in the context of illustrative methods, systems and devices for finding optimized network security policies during a data center migration and detecting a security violation during a steady-state operation. However, it is to be understood that embodiments of the invention are not limited to the illustrative methods, systems and devices but instead are more broadly applicable to other suitable methods, systems and devices.

The term "data center" refers to a functionally centralized system for storing, managing, and disseminating data and information pertaining to one or more entities. For example, a data center comprises interconnected computing, storage and network components, business applications and security infrastructure.

The term "pattern" refers to a path of network connectivity for a service utilizing one or more of applications running on one or more servers. For example, a pattern may comprise information regarding a plurality of servers running applications that collectively perform a service.

The term "recurring pattern" refers to a similarity among two or more patterns. For example, when service A has a pattern that utilizes one or more servers running one or more applications and service B has a pattern that utilizes at least the same one or more servers running the same one or more applications, there is a recurring pattern.

Figure 1:
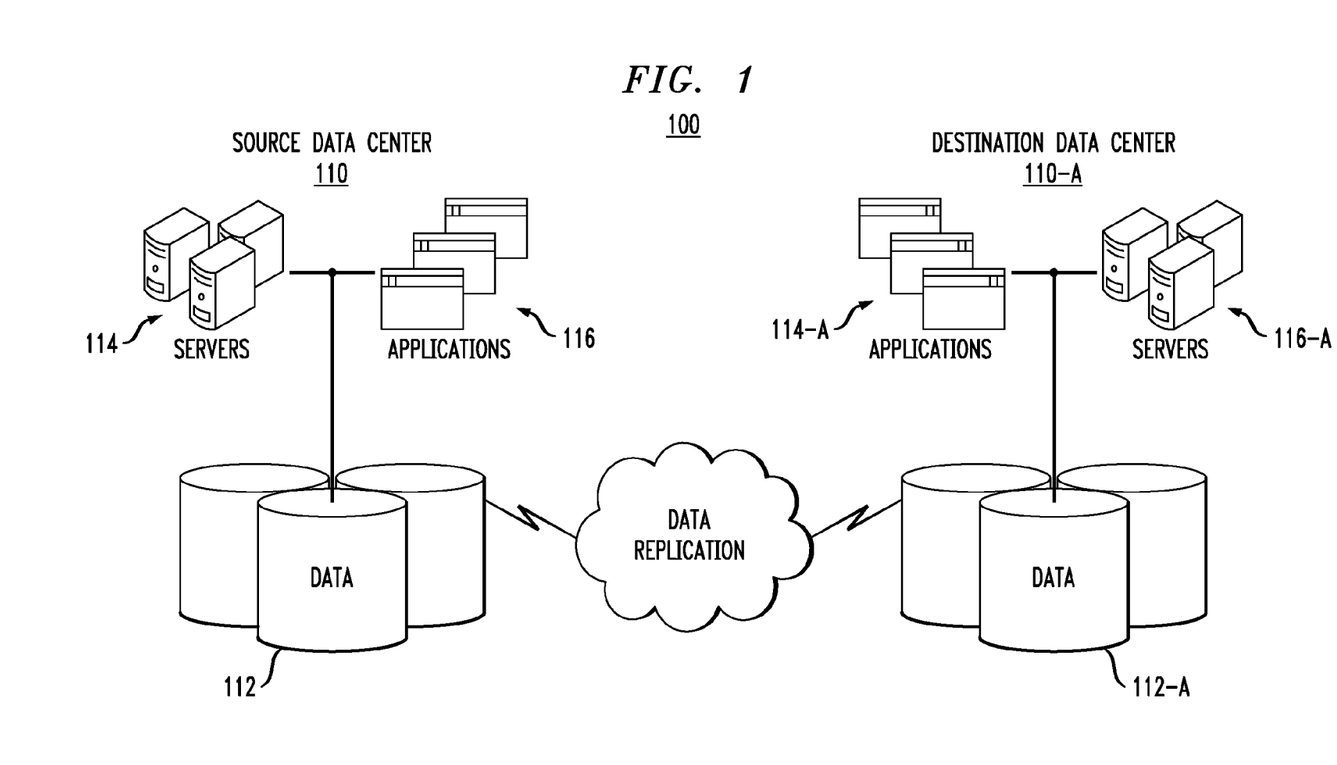
FIG. 1 is a system illustrating a data center migration comprising a source data center and a destination data center.

Many entities undergo the arduous process of a data center migration with the expectation that it will result in more efficient and agile data centers. FIG. 1 shows a system 100 comprising a source data center 110 and a destination data center 110-A. The source data center 110 comprises a network of interconnected data storage 112, servers 114 and applications 116. Whether the destination data center 110-A is another physical computing platform or a virtual or cloud-based computing platform, the goal is to plan and execute a smooth transition, avoiding any unplanned downtime or security risks.

Figure 2:
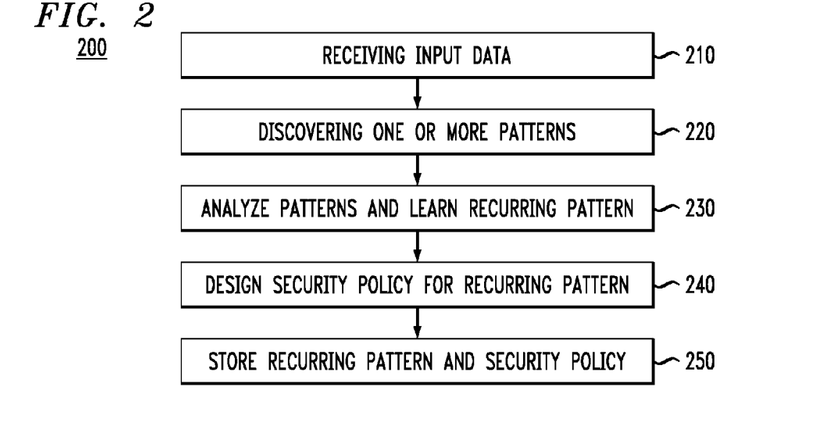
FIG. 2 is an overview of a methodology for finding an optimized network security policy during a data center migration, according to an embodiment of the invention.

During a migration, data center network security policies are often the most challenging to replicate and it is difficult to avoid a compromise of security requirements in both the source data center and the destination data center. FIG. 2 illustrates an overview of a methodology 200 for finding (i.e., determining) optimized network security policies in a source data center. First, step 210 involves receiving input data. Input data may comprise, for example, discovery data, application data, and/or security requirement data obtained from a source data center. Next, step 220 involves discovering from the received input data one or more patterns. A pattern, for example, may comprise detailed information about servers running applications that collectively perform a service. Then, step 230 involves analyzing the discovered patterns and learning a recurring pattern. A recurring pattern, for example, may comprise a learned similarity among the discovered patterns from two or more services. Then, step 240 involves designing (i.e., determining) a security policy for the recurring pattern. Designing the security policy may comprise designing a new policy or retrieving an existing policy for the recurring pattern from a security policy database. Finally, step 250 involves storing the recurring pattern and the security policy designed for the recurring pattern in a security policy database.

Figure 3:
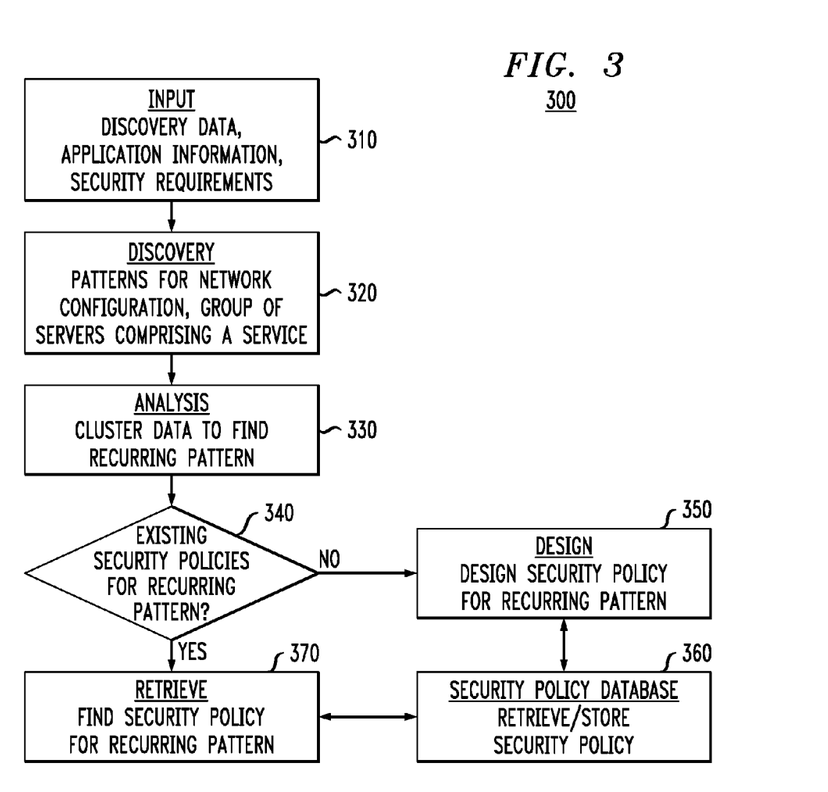
FIG. 3 illustrates a pre-migration flow chart incorporating the methodology of FIG. 2, according to an embodiment of the invention.

The methodology 200 will now be described in more detail with reference to FIGS. 3-6. FIG. 3 illustrates a flow chart for a detailed pre-migration process 300 for finding an optimized security policy. The process 300 begins with block 310 wherein input data from a source data center is received. Input data may comprise, but is not limited to, for example, discovery data, application information data, security requirements data, etc. Discovery data may comprise, for example, information regarding network connectivities and logical dependencies between a plurality of servers and one or more applications running on the servers. Obtaining discovery data may comprise utilizing tools such as Analytics for Logical Dependency Mapping (ALDM) disclosed in U.S. patent Ser. No. 14/091,797, the disclosure of which is incorporated herein in its entirety. Application information data may comprise, for example, application profiles of one or more virtual machines in the source data center environment and one or more types of services performed by the virtual machines. Security requirements data may comprise, for example, compliance and/or client specific data. One of the security requirements may be, for example, to have no public interfaces open to Internet, to have no stagnant ports open, etc.

In the next step of the process, one or more patterns are discovered from the received input data (block 320). A pattern, as disclosed above, contains detailed information about servers running applications that collectively perform a service. For example, a pattern may comprise information regarding a group of servers comprising a service, a network configuration, and connectivity and dependency information among a plurality of servers and applications. Once one or more patterns are discovered, the next step in the process is to cluster all patterns (e.g., by category) and find a recurring pattern by looking for similarities among the discovered patterns (block 330). Learning the recurring pattern may comprise using an optimization function to find a best matching pattern and/or applying a multi-label learning algorithm, which is described in further detail with reference to FIG. 5.

In the next step of the process, a determination is made as to whether there are existing security policies for the recurring pattern (block 340). If it is determined that there are no existing security policies for the recurring pattern, the next step is to design an optimized security policy for the recurring pattern (block 350). Both the recurring pattern and the security policy designed for the recurring pattern are stored in a security policy database for a future retrieval (block 360). If it is determined that one or more security policies for the recurring pattern exist, then in block 370, a security policy for the recurring pattern is retrieved from the security policy database.

Figure 4A:
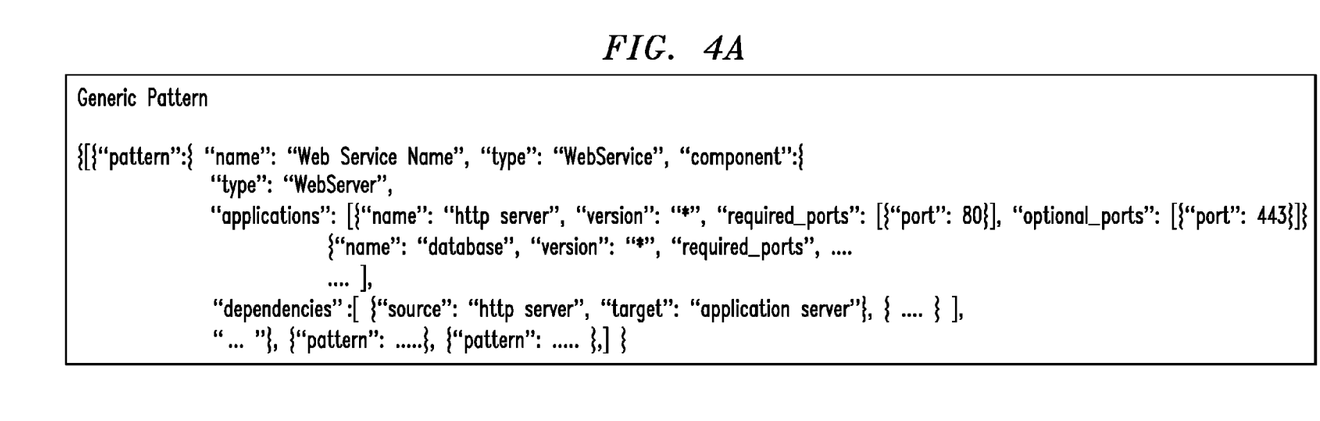
FIG. 4A illustrates an exemplary generic pattern, according to an embodiment of the invention.
Figure 4B:
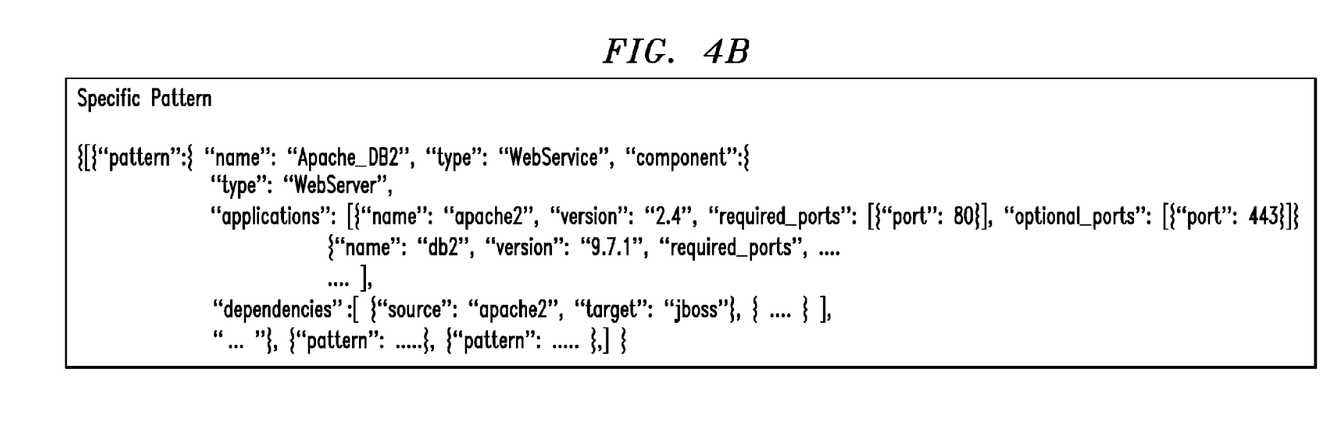
FIG. 4B illustrates an exemplary specific pattern, according to an embodiment of the invention.

FIGS. 4A and 4B illustrate examples of patterns which are discovered in block 320 of FIG. 3. FIG. 4A illustrates a generic pattern represented as name-value pairs comprising information such as service name, type, required port number, dependencies, etc. FIG. 4B is a more specific instance of a pattern. For example, in FIG. 4B, "Apache_DB2" is the name of the web service and "apache2" is the name of the http server for the application, which is of version "2.4" requiring port "80" and an optional port "443." Furthermore, this application is connected to database "db2" version "9.7.1." The pattern in FIG. 4B also shows a dependency between a source server "apache2" and a target server "jboss." The analysis step in block 330 of FIG. 3 analyzes one or more of these patterns to learn a recurring pattern among the discovered patterns.

Figure 5:
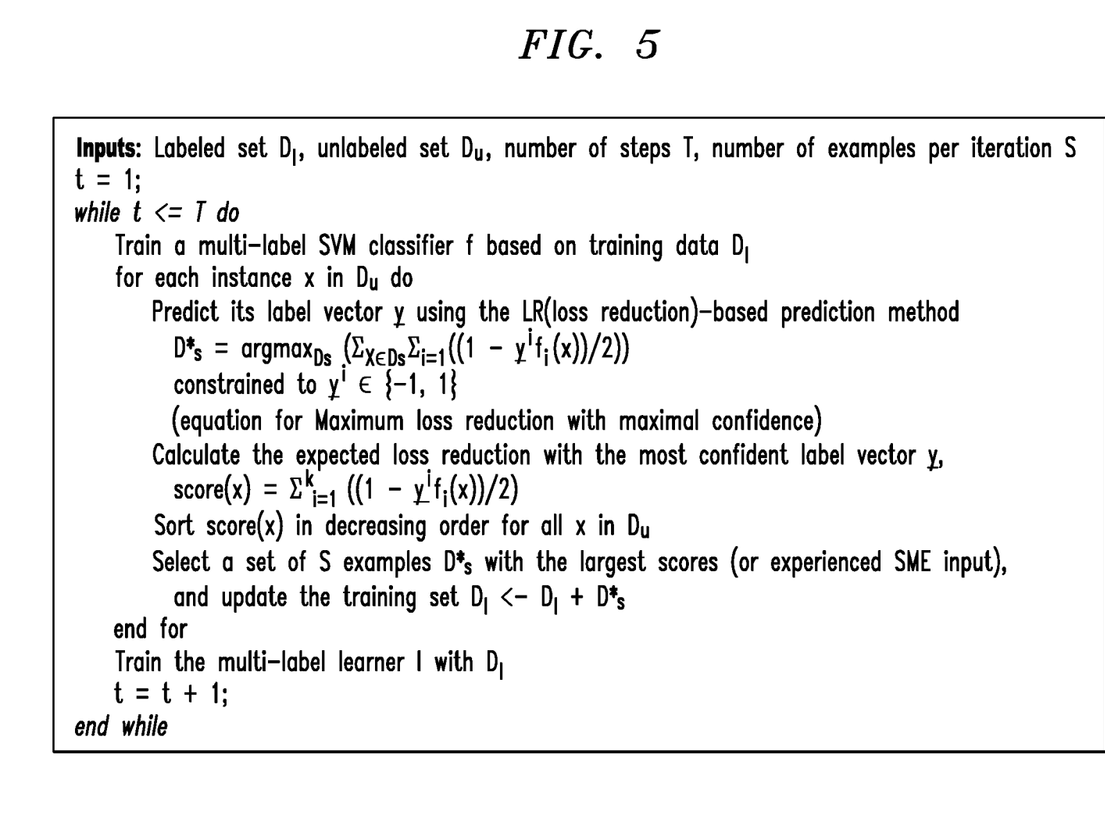
FIG. 5 illustrates an algorithm for training a Support Vector Machine (SVM) classifier, according to an embodiment of the invention.

FIG. 5 illustrates an exemplary algorithm that may be applied as a part of the analysis step in block 330 of FIG. 3. Specifically, FIG. 5 illustrates training a multi-label Support Vector Machine (SVM) algorithm to categorize the discovered patterns. An SVM is a discriminative classifier that analyzes data and recognizes patterns which are used for classification. Given a set of training examples, an SVM training algorithm builds a model that assigns new examples into one of the categories. The SVM classifier illustrated in FIG. 5 utilizes a labeled set $D_l$, which refers to a set of patterns that have been categorized (e.g., business application category, web service category, etc.), an unlabeled set $D_u$, which refers to newly discovered patterns that have not been categorized, and a set of data points $x_1 \ldots x_n$, which represent feature vectors for each instance of netstat information, application type, application group, network monitoring information, etc. The supervised learning algorithm such as SVM can classify a new pattern in unlabeled data set $D_u$ to one of the pre-classified labels in the labeled set $D_l$. Also, when the new pattern is not classified properly (i.e., detected as an outlier), the subject matter expert (SME) can classify the pattern manually and create a new label in the labeled set $D_l$.

The analysis step (block 330) in FIG. 3 may further comprise utilizing an optimization function to find the best matching pattern for the service monitored. For example, within a given category of patterns, there may be multiple patterns available for a service S in the security policy database. Finding the best matching pattern $P_i$ (e.g., with regard to cost or similarity) for the service S requires computing the minimum distance between the service S and all available patterns for the service S. For example:

$$\min D(S,P) = \|(S-P_i)/\sigma_i\|$$

Constrained to $\sigma_i(-[0,1]$

Moreover, when a new input data comprising one or more newly discovered patterns is introduced, the patterns in the new input data are matched to one or more recurring patterns in the security policy database using, for example, the SVM classifier and/or the minimum distance formula. If the one or more patterns in the new input data are not matched to any of the recurring patterns, then that pattern can become a recurring pattern that can be used for subsequent input data.

Figure 6A:
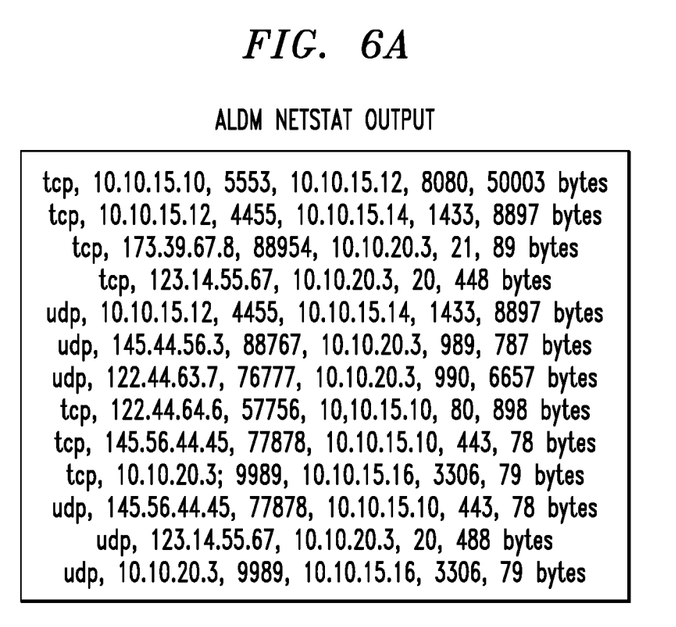
FIG. 6A illustrates an exemplary Analytics for Logical Dependency Mapping (ALDM) output comprising information regarding network connectivity, according to an embodiment of the invention.
Figure 6B:
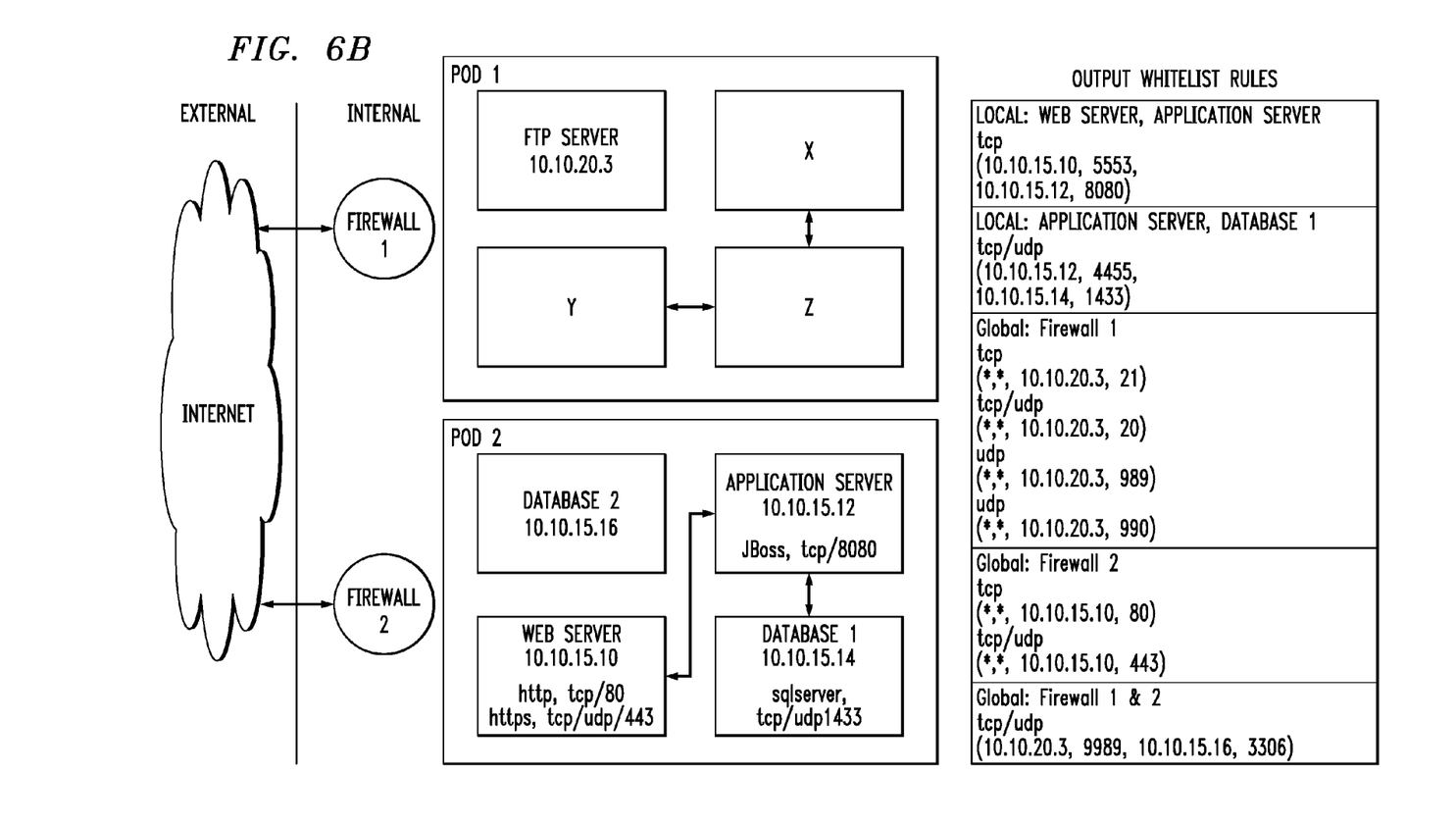
FIG. 6B illustrates an exemplary output whitelist rules for local and global firewall, according to an embodiment of the invention.

In reference to FIGS. 6A and 6B, designing a security policy for a recurring pattern utilizing a logical dependency mapping algorithm is described in more detail. FIG. 6A illustrates a sample ALDM netstat output comprising information regarding network connectivities in a source data center environment. For example, FIG. 6A is an output list comprising a set of user datagram protocols (UDPs) and a set of transmission control protocol (TCPs), along with respective source/destination IP addresses, port numbers, and data sizes. For example, the first line in FIG. 6A is a transmission control protocol for a source server with an IP address "10.10.15.10" and a destination server with an IP address "10.10.15.12," using respective ports. It can be seen from FIG. 6B that the IP address "10.10.15.10" corresponds to the Web Server in Pod 2 and the IP address "10.10.15.12" corresponds to the Application Server in Pod 2. The network connectivity between the Web Server and the Application Server in Pod 2 is included as a local rule in the Output Whitelist Rules table. Similarly, the second line in FIG. 6A is a transmission control protocol between the Application Server in Pod 2 and the Database 1 in Pod 2, which is also included as a local rule in the Output Whitelist Rules table.

In FIG. 6B, Pod 1 comprises the FTP (File Transfer Protocol) Server with an IP address of "10.10.20.3." In FIG. 6A, the third line indicates a network dependency between the FTP Server and another server with an IP address of "173.39.67.8," which is presumed to be a server connected over the Internet. Thus, this network connectivity is included as a global rule through Firewall 1 in the Output Whitelist Rules table. The Web Server in Pod 2 of FIG. 6B is also indicated as having network connectivities with other servers over the Internet (see lines 8, 9 and 11 in FIG. 6A). These network connectivities are included as global rules through Firewall 2 in the Output Whitelist Rules table. Lastly, an inter-Pod network dependency, such as indicated by the last line in FIG. 6A, between the FTP Server in Pod 1 and the Database 2 in Pod 2, is included as a global rule through both Firewalls 1 and 2 in the Output Whitelist Rules table.

When designing the security policy for the learned recurring pattern, the designed security policy must be in compliance with all local and global firewall rules in the source data center environment. Any conflict would indicate a violation in the source data center environment.

Figure 7:
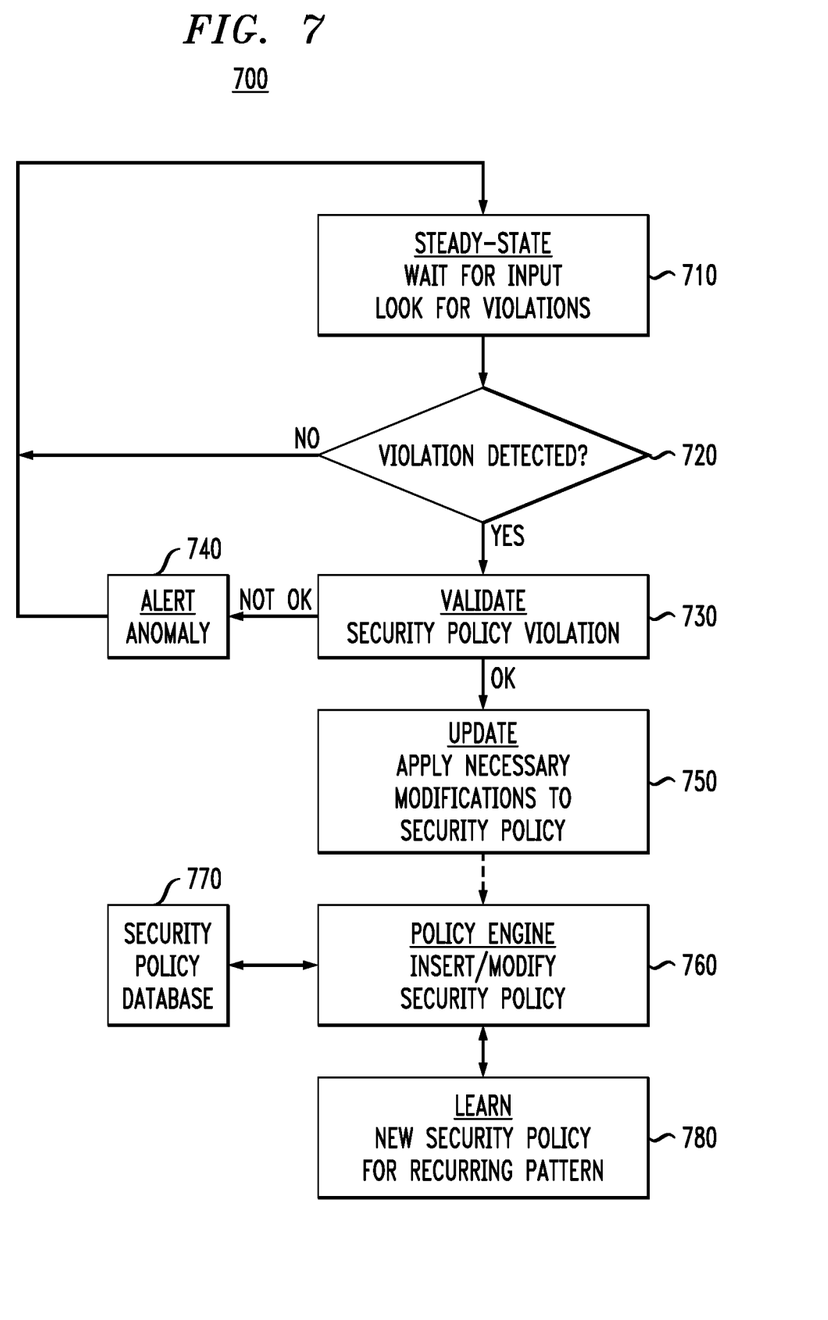
FIG. 7 illustrates a post-migration flow chart for detecting network security violations in a destination data center environment during a steady-state operation, according to an embodiment of the invention.

FIG. 7 illustrates a post-migration flow chart 700 for detecting network security violations in a destination data center system during a steady-state operation. Prior to block 710, the designed security policy for the recurring pattern is applied in the destination data center system. The system waits for a network security violation during the steady-state operation (block 710). Once a possible network security violation is detected (block 720), the system attempts to validate the violation (block 730). If the violation is determined to be a false alert, an anomaly is reported (block 740). Once the network security violation is validated, the next step is to apply any necessary modifications to the designed security policy for compliance in the destination data center system (block 750). Once the designed security policy is modified, a policy engine module modifies the stored security policy (block 760) in the security policy database (block 770). The dotted arrow connecting block 750 and block 760 indicates that the system may also provide for the policy engine module to reflect any false-alert situation. In block 780, the system monitors for further updates to the designed security policy.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
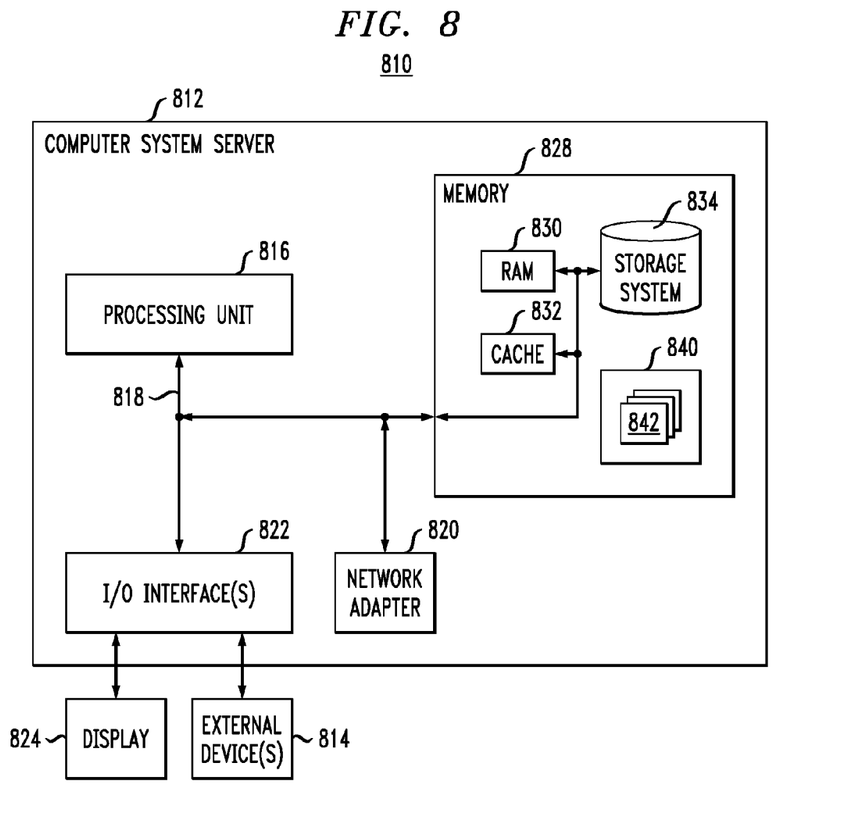
FIG. 8 depicts a computer system in accordance with which one or more components/steps of techniques of the invention may be implemented according to an embodiment of the invention.

One or more embodiments can make use of software running on a general-purpose computer or workstation. With reference to FIG. 8, in a computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

The bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 812 typically includes a variety of computer system readable media. Such media may be any available media that is accessible by computer system/server 812, and it includes both volatile and non-volatile media, removable and non-removable media.

The system memory 828 can include computer system readable media in the form of volatile memory, such as random access memory (RAM) 830 and/or cache memory 832. The computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 818 by one or more data media interfaces. As will be further depicted and described below, the memory 828 may include at least one program product having a set (e.g., at least one) of program modules that are configured to carry out the functions of embodiments of the invention. A program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

It is understood in advance that although this disclosure includes a detailed description on cloud computing below, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Computer system/server 812 in FIG. 8 is an example of a cloud computing node. It is to be appreciated, however, that the computer system/server 812 in FIG. 8 is only one example of a suitable cloud computing node and is not intended to suggest any limitation as to the scope of use or functionality of embodiments of the invention described herein. Regardless, the computer system/server 812 is an example of a cloud computing node capable of being implemented and/or performing any of the functionality set forth hereinabove.

Figure 9:
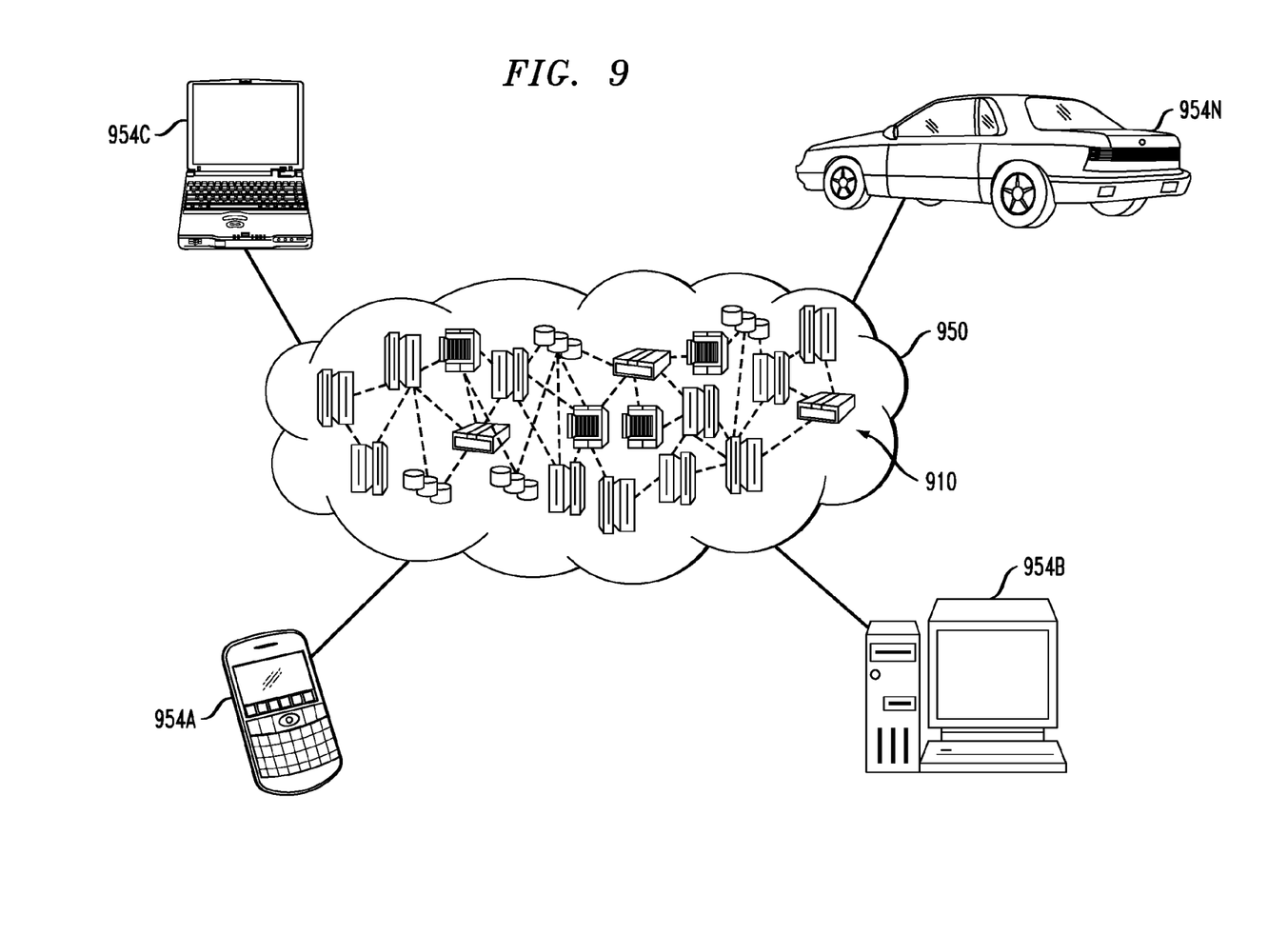
FIG. 9 depicts a cloud computing environment, according to an embodiment of the invention.

Referring now to FIG. 9, illustrative cloud computing environment 950 is depicted. As shown, cloud computing environment 950 comprises one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
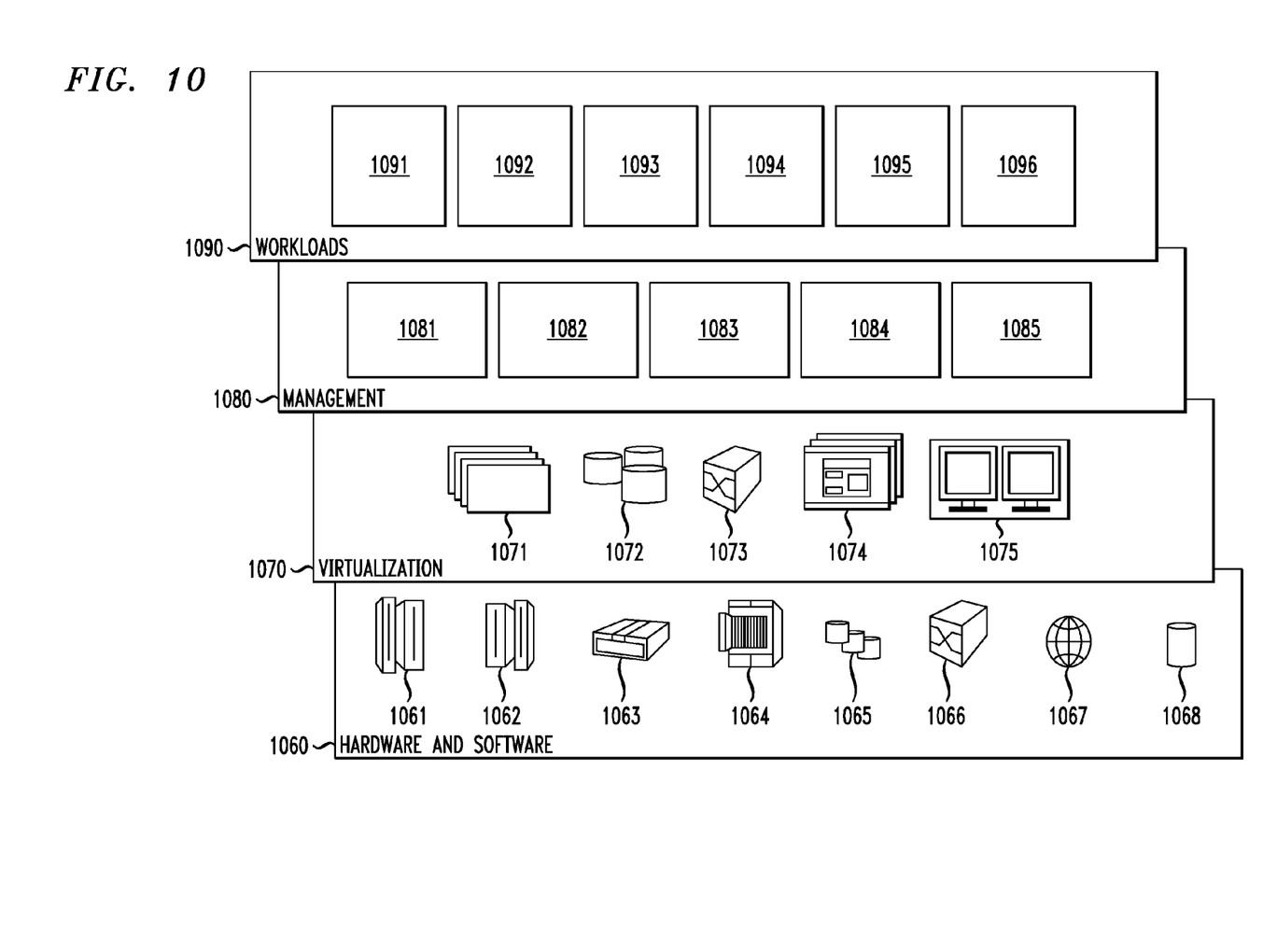
FIG. 10 depicts abstraction model layers according to an embodiment of the invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and object detection and tracking 1096, which may implement the functionality described above with respect to FIGS. 1-7.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving input data from a source environment to a destination data center environment wherein the source environment comprises a plurality of servers and one or more applications running on at least one of the servers;
   discovering from the received data one or more patterns wherein the patterns comprise information regarding one or more of the plurality of servers running one or more of the applications that collectively perform a service;
   analyzing the patterns to learn a recurring pattern, wherein learning the recurring pattern further comprises applying a multi-label learning algorithm to categorize the one or more discovered patterns;
   determining a security policy for the recurring pattern;
   storing the recurring pattern and the security policy determined for the recurring pattern in a database; and
   implementing the determined security policy in the destination data center environment.

2. The method of claim 1, wherein the input data further comprises:
   discovery data comprising information regarding at least one of network connectivities and logical dependencies between the plurality of servers and the one or more applications in the source environment;
   application information data comprising application profiles of one or more virtual machines in the source environment and one or more types of services performed by the virtual machines; and
   security requirement data comprising at least one of compliance and client specific data.

3. The method of claim 1, wherein the multi-label learning algorithm comprises training a Support Vector Machine (SVM) classifier for the received input data.

4. The method of claim 1, wherein the determined security policy is in compliance with local and global firewall rules in the source environment.

5. The method of claim 1, wherein non-compliance of the determined security policy with the local and global firewall rules indicates a security policy violation in the source environment.

6. The method of claim 1, further comprising:
   detecting a security policy violation during a steady-state operation;
   modifying the security policy for the recurring pattern; and
   updating the database with the modified security policy.

7. An apparatus, comprising:
   a memory; and
   a processor operatively coupled to the memory and configured to:
      receive input data from a source environment to a destination data center environment wherein the source environment comprises a plurality of servers and one or more applications running on at least one of the servers;
      discover from the received data one or more patterns wherein the patterns comprise information regarding one or more of the plurality of servers running one or more of the applications that collectively perform a service;

analyze the patterns to learn a recurring pattern, wherein learning the recurring pattern further comprises applying a multi-label learning algorithm to categorize the one or more discovered patterns;

determine a security policy for the recurring pattern;

store the recurring pattern and the security policy determined for the recurring pattern in a database; and implement the determined security policy in the destination data center environment.

8. The apparatus of claim 7, wherein the input data further comprises:

discovery data comprising information regarding at least one of network connectivities and logical dependencies between the plurality of servers and the one or more applications in the source environment;

application information data comprising application profiles of one or more virtual machines in the source environment and one or more types of services performed by the virtual machines; and security requirement data comprising at least one of compliance and client specific data.

9. The apparatus of claim 7, wherein the multi-label learning algorithm comprises training a Support Vector Machine (SVM) classifier for the received input data.

10. The apparatus of claim 7, wherein the determined security policy is in compliance with local and global firewall rules in the source environment.

11. The apparatus of claim 7, wherein non-compliance of the determined security policy with the local and global firewall rules indicates a security policy violation in the source environment.

12. The apparatus of claim 7, wherein the processor is further configured to:

detect a security policy violation during a steady-state operation;

modify the security policy for the recurring pattern; and update the database with the modified security policy.

13. An article of manufacture comprising a computer readable storage medium for storing computer readable program code which, when executed, causes a computer to:

receive input data from a source environment to a destination data center environment wherein the source environment comprises a plurality of servers and one or more applications running on at least one of the servers;

discover from the received data one or more patterns wherein the patterns comprise information regarding one or more of the plurality of servers running one or more of the applications that collectively perform a service;

to analyze the patterns to learn a recurring pattern, wherein learning the recurring pattern further comprises applying a multi-label learning algorithm to categorize the one or more discovered patterns;

to determine a security policy for the recurring pattern;

to store the recurring pattern and the security policy determined for the recurring pattern in a database; and implement the determined security policy in the destination data center environment.

14. The article of claim 13, wherein the input data further comprises:

discovery data comprising information regarding at least one of network connectivities and logical dependencies between the plurality of servers and the one or more applications in the source environment;

application information data comprising application profiles of one or more virtual machines in the source environment and one or more types of services performed by the virtual machines; and security requirement data comprising at least one of compliance and client specific data.

15. The article of manufacture of claim 13, wherein the determined security policy is in compliance with local and global firewall rules in the source environment.

16. The article of manufacture of claim 13, wherein non-compliance of the determined security policy with the local and global firewall rules indicates a security policy violation in the source environment.

17. The article of manufacture of claim 13, further causing the computer to:

detect a security policy violation during a steady-state operation;

modify the security policy for the recurring pattern; and update the database with the modified security policy.

* * * * *